(12) United States Patent
Siefert et al.

(10) Patent No.: US 11,169,491 B2
(45) Date of Patent: Nov. 9, 2021

(54) SAFETY SWITCH

(71) Applicant: Euchner GmbH + Co. KG, Leinfelden-Echterdingen (DE)

(72) Inventors: Timo Siefert, Leinfelden-Echterdingen (DE); Melissa Joos, Leinfelden-Echterdingen (DE); Frederic Hahn, Hilden (DE); Zeiler Gerd, Leinfelden-Echterdingen (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 276 days.

(21) Appl. No.: 16/364,221

(22) Filed: Mar. 26, 2019

(65) Prior Publication Data

US 2019/0324410 A1  Oct. 24, 2019

(30) Foreign Application Priority Data

Apr. 20, 2018 (EP) ..................... 18168566

(51) Int. Cl.
    *G05B 9/03* (2006.01)
    *G05B 19/048* (2006.01)
    *H02B 1/04* (2006.01)

(52) U.S. Cl.
    CPC ............. *G05B 9/03* (2013.01); *G05B 19/048* (2013.01); *H02B 1/04* (2013.01); *G05B 2219/21152* (2013.01)

(58) Field of Classification Search
    CPC ................... G05B 9/03; G05B 19/048; G05B 2219/21152; H02B 1/04; H01H 9/22; F16P 3/142; F16P 3/10; E05F 15/60; E05Y 2900/608
    See application file for complete search history.

(56) References Cited

U.S. PATENT DOCUMENTS

| | | | |
|---|---|---|---|
| 2003/0037555 A1* | 2/2003 | Street | G05D 23/1917 62/175 |
| 2007/0090694 A1* | 4/2007 | Pullmann | H01H 47/002 307/112 |
| 2013/0314231 A1 | 11/2013 | Auger | |
| 2016/0299484 A1* | 10/2016 | Nair | G05B 19/0425 |

FOREIGN PATENT DOCUMENTS

| | | |
|---|---|---|
| DE | 102011051629 B3 | 8/2012 |
| EP | 3133447 A1 | 2/2017 |

* cited by examiner

*Primary Examiner* — Christopher E. Everett
(74) *Attorney, Agent, or Firm* — Michael Soderman

(57) ABSTRACT

A series connection having multiple safety switches. Here, the series connection includes wiring connecting the safety switches. The safety switches can output signals. Depending on the registration of these signals by additional safety switches of the series connection it will be detected whether the wiring is laid out for connecting a master, and whether such a master is connected. Depending on this, the operation of the safety switches is predetermined.

12 Claims, 1 Drawing Sheet

SAFETY SWITCH

CROSS REFERENCE TO RELATED APPLICATIONS

This application claims the priority of EP 18168566.0 filed on 2018 Apr. 20; this application is incorporated by reference herein in its entirety.

BACKGROUND

The invention concerns a safety switch.

Safety switches are used in the area of safety technology, with said switches being used, in particular, for securing hazardous areas around systems. The term 'system' comprises, in particular, also machines, work equipment, and such.

Such safety switches may, e.g., work with transponders, with the transponder signals allowing the detection of whether a separating safety device, such as a door as access to a system, is closed or not.

Such a safety switch generally possesses an input/output structure having inputs and outputs that can, in particular, be designed to be redundant. The safety switch generates in accordance with its monitoring function, in particular, depending on the transponder signal, a switching signal that is output to a controller that controls the system to be monitored. If the safety switch detects a non-hazardous state, in particular, that a door to be monitored is closed, thus blocking the access to a hazardous area in which, e.g., the system is arranged, a switching signal with the switching state of "switched-on state" corresponding to an active safety condition, i.e., a release signal, will be generated. If the controller receives this release signal from the safety switch, the controller can start the operation of the system, or allow the system to continue to operate. If, however, the safety switch detects an open door, the safety switch will generate a switching signal having the "switched-off" switching state, corresponding to a non-active safety condition. In this case, the safety switch will switch the system off in order to prevent hazardous conditions.

For performing, in particular, more complex monitoring tasks a series connection having multiple safety switches can be used. Here, each safety switch can monitor a separate area, e.g., for securing a system. Here, each safety switch will generate a corresponding switching signal, linking it in series with the read-in switching signal from the upstream safety switch and then forwarding it to the next safety switch in the series. The controller will then release the system's operation only if all of the safety switches are generating a release signal. Typically, the safety switches in the series connection constitute the slaves in a master/slave arrangement. In such a master/slave arrangement, diagnostics operation will generally be performed by the master cyclically and acyclically polling data, in particular, sensor or switch data.

SUMMARY

The invention concerns a series connection (1) having multiple safety switches (2). Here, the series connection (1) includes wiring connecting the safety switches (2). The safety switches (2) can output signals. Depending on the registration of these signals by additional safety switches (2) of the series connection (1) it will be detected whether the wiring is laid out for connecting a master (6), and whether such a master (6) is connected. Depending on this, the operation of the safety switches (2) is predetermined.

DETAILED DESCRIPTION

The problem underlying the invention is to provide a series connection of safety switches having expanded functionality.

The features of the independent claims are provided to solve this problem. Advantageous embodiments and useful further embodiments are described in the dependent claims.

The invention concerns a series connection having multiple safety switches. The series connection includes wiring connecting the switches. The safety switches can output signals, with the fact whether the wiring is designed for connecting a master and whether such a master is connected and able to communicate being detected depending on said output signals being registered by additional safety switches of the series connection. Depending on this being the case, the operation of the safety switches is specified.

The invention further concerns a corresponding method.

An essential advantage of the invention consists of the fact that the safety switches themselves can autonomously detect the configuration of the series connection by analyzing the ability to read back signals from additional safety switches, and configure and perform their operation accordingly. This results in a high level of functionality of the series connection according to the invention.

Depending on whether or not the safety switches of the series connection are integrated into a master/slave system, different types of wiring of the series connection are provided for connecting the safety switches. Depending on these different types of wiring, the ability to read back signals of a safety switch into the additional safety switches will vary, which allows detecting unambiguously whether or not the series connection is designed for master/slave operation. In addition, registering signals of a master that differ from signals of the safety switches as slaves in a master/slave system allows detecting unambiguously whether a master is connected to the safety switches.

As these types of connection can be detected and distinguished from each other by the safety switches, the safety switches can then autonomously adapt their mode of operation based on this.

As the safety switches are designed to be used in safety technology, each safety switch includes a redundant input/output structure via which switching signals generated in the safety switches can be transmitted. For forming the series connection, redundant outputs of a safety switch are connected to redundant inputs of a downstream safety switch.

Here, the switching signals constitute safety-relevant signals whose switching state indicates the current monitoring state of a unit to be monitored, such as a separating safety device, in particular a safety door by means of which the access to a hazardous area can be blocked.

A system secured by means of the safety switches will not be operated unless each safety switch generates a release signal as its switching signal. Here, a safety switch will generate its switching signal depending on the current monitoring state and also depending on the switching signal generated by the upstream safety switch and read into the latter. The switching signal generated in the safety switch will then be forwarded to the downstream safety switch in the series until finally, the switching signal present at the output of the series connection is routed to the controller.

Each safety switch further possesses a communications port. Each communications port will be connected by a line to a diagnostics line only if the series connection is designed for being operated with a master. The communication can be bidirectional.

Here, the master can be connected to the diagnostics line. Consequently, the slaves will be wired to the master in parallel.

Both safety-relevant as well as non-safety-relevant data will be transferred via the diagnostics line. This diagnostics line will be used, in particular, in master/slave operation so that the master can control the slaves embodied by the safety switches, and/or cyclically or acyclically poll the slaves.

According to the invention, the data transferred via the diagnostics line will be used in the safety switches for checking whether or not the series connection is designed for operation with a master.

Here, the fact is utilized that, in a design for master/slave operation the data that is output by a safety switch via the communications port is provided to the other safety switches via the diagnostics line. If, however, the series connection is not designed for master/slave operation, the communications ports will be used as message outputs and will not be connected via the diagnostics line. Message and/or diagnostic data will not be provided from one safety switch to the other safety switches via the communications port, but instead, directly to an external unit, in particular, the controller. Thus it can be easily and securely determined by a check of whether data that is output by the safety switches via the communications port is provided to the other safety switches, whether the series connection is designed for master/slave operation or not.

According to an advantageous embodiment, during a startup phase each safety switch generates test patterns based on which the position of the respective safety switch within the series connection is defined. This start-up phase is, in particular, the ramp-up phase during each device start-up before the normal operation phase, the so-called operating mode, begins. Information from the test patterns, i.e., the information about the position parameters of the safety sensors in the series connection, will be used for determining the wiring.

The issuance of the position parameters, and thus of the addresses of the safety switches in the series connection, is initiated by the safety switches themselves by sending a test pattern in the form of an impulse via at least one output that is, in particular, laid out as a safety output. After sending the impulse, each safety switch checks at at least one input that is, in particular, laid out as a safety input, whether an impulse forming a test pattern is received.

The first safety switch of the series connection whose inputs are, e.g., connected to a bridge switch, receives a static input signal at its at least one input. Thereby this safety switch identifies itself as the first safety switch of the series connection and sends a test pattern in the form of an impulse as an output signal via its at least one output to the next safety switch of the series connection. This safety switch reads this impulse as a test pattern at at least one of its inputs, identifying itself as the second safety switch of the series connection, and accordingly sends two impulses as test patterns to the next safety switch via its at least one output. This is repeated until each safety switch has been addressed based on its test pattern; i.e., the position in the series connection, which is determined by the number of impulses. The information about these test patterns is then output via the communications port of the respective safety switch.

As, during the start-up phase preceding the operating mode, the wiring and thus the embodiment of the series connection is determined based on the test patterns, the setting of the mode of operation of the safety switches can also be performed during the start-up phase so that the safety switches of the series connection are adapted to the existing series connection and can start their operation without further adaptations. This allows replacing a safety switch while the series connection is in operation.

In the event that the safety switches do not receive any information about the test patterns of additional safety switches during the start-up phase, the safety switches will autonomously switch into operation without a master, operating the communications ports as message outputs.

As the information about the test patterns of a safety switch is not detected by the other safety switches, preferably within a pre-set time-out time interval, it will be detected that the communications ports are not connected to the diagnostics line, thus making master/slave operation impossible.

Then, the communications ports of the safety switches will autonomously be reconfigured into message outputs, thus allowing direct communication between them and an external unit, e.g., the controller controlling the system to be secured.

In the event that the safety switches receive information during the start-up phase about the test patterns of the safety switches from the additional safety switches and a master connected to the diagnostic line, the master will monitor the allocation of the positions of the safety switches in the series connection.

In this case, based on the information about the test patterns, or respectively, the signals generally provided via the diagnostics line, it will not only be detected that the series connection is designed for master/slave operation, but also that a master is connected to the safety switches and is ready for communication.

In this case the position parameters encoded in the information about the test patterns will be forwarded to the master so that the number of safety switches and their positions within the series connection are known in the master.

The positions will be adopted by the master as addresses under which the master addresses the safety switches as slaves in the master/slave operation.

In the event that during the start-up phase, a master is not connected to the diagnostics line, or the connected master is not ready for operation, and the information about the test patterns of the safety switches is received by the downstream safety switches, a selected safety switch will monitor the allocation of the positions of the safety switches in the series connection.

Thus, based on the information about the test patterns that the safety switches output on the diagnostics line, the design of the series connection is detected to be a master/slave system. However, during the start-up phase, there is no master connected to the safety switches and/or ready for operation.

In known such master/slave systems, these systems cannot be started without the master. In contrast, the functionality of the system according to the invention is expanded such that it can also be started without the master.

Here, the selected safety switch temporarily assumes the master functionality, with the selected safety switch expediently being the safety switch taking up the first position in the series connection.

The selected safety switch registers from the information about the test patterns of the other safety switches how many safety switches are connected to the series connection.

After the positions have been allocated, the selected safety switch sends the number of all safety switches as a broadcast signal, with the master adopting this number as soon as the master has been connected to the series connection and is operational.

This approach has the advantage that the master, when connected to the series connection, can perform its control functions as the master without the operation of the overall system being interrupted. As the master receives the broadcast signal from the selected safety switch, the number of the connected slaves is known in the master so that the master can cyclically or acyclically poll the safety switches as slaves, with the slaves, in particular also the first selected safety switch, responding, i.e., sending signals via the communications port, only to the master's query anymore.

BRIEF DESCRIPTION OF THE DRAWINGS

Below, the invention is explained based on the drawings. They show the following.

DETAILED DESCRIPTION OF THE PREFERRED EMBODIMENTS

Figure 1:
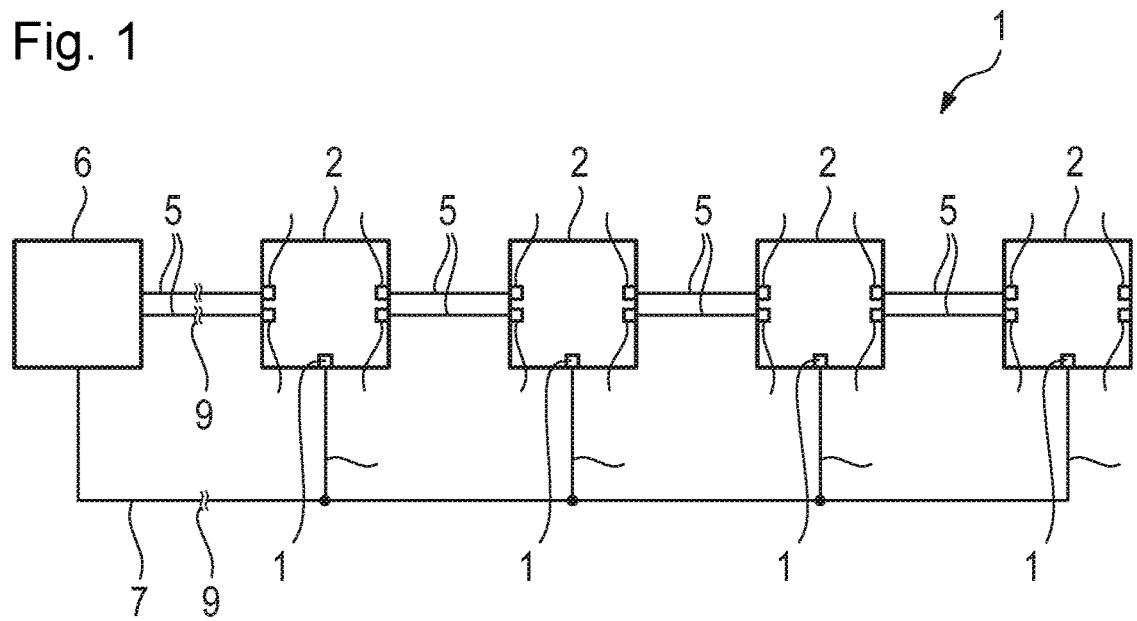
FIG. 1: Exemplary embodiment of the series connection of security switches according to the invention.
Figure 2A:
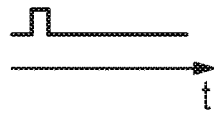
FIG. 2A: The test pattern of the first safety switch.
Figure 2B:
FIG. 2B: The test pattern of the second safety switch.
Figure 2C:
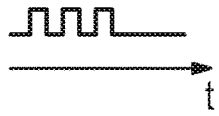
FIG. 2C: The test pattern of the third safety switch.
Figure 2D:
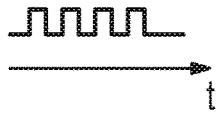
FIG. 2D: The test pattern of the fourth safety switch.

FIG. 1 shows, in a highly schematic manner, an exemplary embodiment of the series connection 1 according to the invention, consisting of an arrangement of multiple safety switches 2.

FIG. 1 here shows a series connection 1 of four identically designed safety switches 2. It is, however, not mandatory for the safety switches 2 to be identical. Generally, the series connection 1 can also have a different number of safety switches 2. Finally, a single safety switch 2 can also be used.

The safety switches 2 are used in the area of safety technology. In particular, a safety switch 2 is used for monitoring whether a separating safety device, such as a door blocking the access to a hazardous area in which a hazardous system is located, is closed. Here, the closed position of the door can be checked by means of transponder signals. Here, a transponder can be arranged inside an actuator that is arranged on and movably connected to the door. The safety switch 2 is then arranged on a frame delimiting the access. If the door is in the closed position, the transponder is within the reading range of an RFID reading device arranged in the safety switch 2, so that the RFID reading device can receive the transponder's transponder signals.

Each safety switch 2 possesses a redundant input structure having two inputs 3, and a redundant output structure having two outputs 4 via which switching signals generated in the safety switches 2 are forwarded as safety-relevant signals depending on which the system will be released or shut down, so that these signals are processed in an upstream controller. The inputs 3 are laid out as safety inputs, the outputs 4 are laid out as safety outputs.

In the series connection 1 according to FIG. 1, each of the outputs 4 of a safety switch 2 is connected via lines 5 to the respective inputs 3 of the respective down-stream safety switch 2. The outputs 4 of the last safety switch 2 are connected to a master 6.

The master 6 can, e.g., be laid out as a safety relay or as an I/O module, such as an I/O link module. For one, the master 6 is used for connecting to a higher-level controller controlling the operation of the system to be monitored. In addition, the master 6 controls the master/slave system, which includes, in addition to this master 6, the safety switches 2 as slaves. For this purpose, the safety switches 2 and the master 6 are connected via a diagnostics line 7. Here, each safety switch 2 includes a communications port 10, from which an additional line 8 is routed to the diagnostics line 7.

While the series connection 1 is in operating mode, each safety switch 2 assumes its monitoring function and generates accordingly a switching signal that is linked to the switching signal of the upstream safety switch 2 (if present), which is read via line 5 and then forwarded to the next safety switch 2 via the lines 5. The last safety switch 2 then forwards a switching signal to the master 6, which provides it then to the controller. The controller will then release the operation of the system only if a release signal has been generated by any and all safety switches 2 of the series connection 1.

Alternatively to the variant shown in FIG. 1, in which the series connection 1 forms a master/slave system, the communications ports 10 of the safety switches 2 can also be connected not to the diagnostics line 7, but instead via lines 8 directly to an external unit, in particular, to the controller.

During the ramp-up phase of each device start, henceforth referred to as start-up phase, which precedes the operating mode, i.e., the normal operation phase, the addressing of the individual safety switches 2 in the series connection 1 is performed.

The allocation of the position parameters, and thus, the addresses of the safety switches 2 in the series connection 1 is initiated by the safety switches 2 themselves by sending a test pattern in the form of an impulse via at least one output 4, which is, in particular, laid out as a safety output. After the impulse has been sent, each safety switch 2 checks at at least one input 3, which is, in particular, laid out as a safety input, whether a test pattern in the form of an impulse is received.

The first safety switch 2 of the series connection 1 (at the very right in FIG. 1), whose inputs are, e.g., connected to a bridge switch, receives a static input signal in its at least one input. By means of this the safety switch 2 identifies itself as the first safety switch 2 in the series connection 1 and sends a test pattern in the form of an impulse as an output signal via its at least one output 4 to the next safety switch 2 of the series connection 1. This safety switch 2 reads this impulse as a test pattern at its at least one input 3, identifies itself as the second safety switch 2 in the series connection 1 and sends accordingly two impulses as test pattern via at least one of its outputs 4 to the next safety switch 2. This is continued until each safety switch 2 is addressed based on its test pattern; i.e., the position in the series connection 1 determined by the number of impulses. The test patterns of the individual safety switches 2 are shown in FIGS. 2a-d. The information about these test patterns is then output via the communications port 10 of the respective safety switch 2.

The different configurations of the series connection 1 are, according to the invention, detected autonomously by the safety switches 2 during the start-up phase. For this purpose, information about the test patterns is used that are output via the communications ports 10 of the individual safety switches. The information includes the position of the individual safety switch.

If the series connection 1 does not form a master/slave system; i.e., if the communications ports 10 are not connected to the diagnostics line 7, the information about the test patterns is not provided via the diagnostics line 7. After the safety switches 2 do not receive any test patterns from the other safety switches 2 during a preset time-out time interval, all of the safety switches 2 will switch the configuration of the communications ports 10 to a message output so that these can directly communicate with the external unit.

If the series connection 1, as shown in FIG. 1, forms a master/slave system, it will be detected during the start-up phase by the safety switches 2 based on the fact that these are detected during the start-up phase by the respective other safety switches 2.

In the event that during the start-up phase, the master 6 is connected to the series connection 1 (as shown in FIG. 1), the master 6 will monitor the position allocation of the safety switches 2 and then use the positions as addresses under which it addresses the safety switches 2 as slaves in the master/slave operation.

In the event that during the start-up phase, the master 6 is not yet connected to the series connection 1, or the master is not yet ready for operation (as indicated in FIG. 1 by the interruptions 9), the operation of the series connection 1 can be started, i.e., even without the master 6.

In this case, the allocation of positions of the safety switches 2 is monitored by the first safety switch 2 by registering and storing the information about the test patterns of the other safety switches 2. The first safety switch 2 as the selected safety switch 2 thus temporarily assumes the master functionality.

After the selected safety switch 2 has registered the positions of all of the safety switches 2 connected to the series connection 1, which condition is detected by the fact that after a preset time, no new information about the test patterns is received anymore, the selected safety switch 2 sends the number of the safety switches in the series connection 1 as broadcast signals to the diagnostics line 7. As soon as the master 6 is connected to the series connection 1 and has started up, it adopts the number of the connected safety switches 2 and assumes also the master function in the series connection 1. Then the master 6 cyclically and acyclically polls the safety switches 2 under their addresses, i.e., positions that the safety switches 2 report to the master 6 as slaves. The slaves, in particular, the selected safety switch 2, then respond only to queries from the master 6.

LIST OF REFERENCE NUMERALS (1) Series connection
(2) Safety switch
(3) Input
(4) Output
(5) Line
(6) Master
(7) Diagnostics line
(8) Line
(9) Interruption
(10) Communications port

The invention claimed is:

1. A series connection (1) having multiple safety switches (2), with the series connection (1) possessing wiring connecting the safety switches (2), characterized in that signals can be output by the safety switches (2), wherein it is detected, depending on the registration of these signals by additional safety switches (2) of the series connection (1), whether the wiring is laid out for connecting a master (6), and whether such a master (6) is connected, and that depending on this, the operation of the safety switches (2) is predetermined by the safety switches themselves, wherein, in the case that no master exists, the series connection is started and enters into a normal operation phase without the master, wherein each safety switch (2) includes a communications port (10), wherein only in case of a design for operation of the series connection (1) with the master (6) a line (8) is routed from each communications port (10) to a diagnostics line (7), wherein the master (6) can be connected to the diagnostics line (7), wherein in the event of operation without the master (6), the communications ports (10) of the safety switches (2) are operated as message outputs, and wherein each safety switch (2) includes a redundant input and output structure, via which switching signals generated in the safety switches (2) can be transmitted, wherein redundant outputs (4) of a safety switch (2) are connected to redundant inputs (3) of a downstream safety switch (2) for forming the series connection (1).

2. The series connection (1) according to claim 1, characterized in that signals output via the communications port (10) in a safety switch (2) are routed to the additional safety switches (2).

3. The series connection (1) according to claim 1, characterized in that during a start-up phase, each safety switch (2) generates test patterns based on which the position of each safety switch (2) in the series connection (1) is determined, with the information about the test patterns having been used for determining the wiring of the series connection (1).

4. The series connection (1) according to claim 3, characterized in that information about the test patterns is transmitted via the diagnostics line (7), with this information being used for determining the wiring.

5. The series connection (1) according to claim 4, characterized in that in the event that during the start-up phase, the safety switches (2) do not receive any information about the test patterns from additional safety switches (2), the safety switches (2) autonomously change to operation without a master (6) and operate the communications port (10) as a message output.

6. The series connection (1) according to claim 5, characterized in that after the allocation of the positions, the selected safety switch (2) sends the number of all of the safety switches (2) as a broadcast signal, with the master (6) adopting this number as soon as the master is connected to the series connection (1).

7. The series connection (1) according to claim 4, characterized in that in the event that during the start-up phase information about test patterns of the safety switches (2) is received by the additional safety switches (2) and information about test patterns is received by a master (6) connected to the diagnostics line (7), the allocation of the positions of the safety switches (2) in the series connection (1) is monitored by the master (6).

8. The series connection (1) according to claim 4, characterized in that in the event that during the start-up phase a master (6) is not connected to the diagnostics line (7) and the information about the test patterns of the safety switches (2) is received by the additional safety switches (2), a selected safety switch (2) monitors the allocation of the positions of the safety switches (2) within the series connection (1).

9. The series connection (1) according to claim 8, characterized in that the selected safety switch (2) is that safety switch (2) which occupies the first position within the series connection (1).

10. The series connection (1) according to claim 3, characterized in that the test pattern of each safety switch (2) contains a sequence of impulses with a number of impulses encoding the position of the respective safety switch (2) within the series connection (1).

11. The series connection (1) according to claim 1, characterized in that an allocation of positions of the safety switches is monitored by a first safety switch by registering and storing the information about test patterns of the other safety switches.

12. A method for operating a series connection (1) having multiple safety switches (2), with the series connection (1) having wiring connecting the safety switches (2), characterized in that the safety switches (2) can output signals, wherein depending on the registration of these signals by additional safety switches (2) of the series connection (1) it will be detected whether the wiring is laid out for connecting a master (6) and whether such a master (6) is connected, and that depending on this, the operation of the safety switches (2) is predetermined by the safety switches themselves, wherein, in the case that no master exists, the series connection is started and enters into a normal operation phase without the master, wherein each safety switch (2) includes a communications port (10), wherein only in case of a design for operation of the series connection (1) with the master (6) a line (8) is routed from each communications port (10) to a diagnostics line (7), wherein the master (6) can be connected to the diagnostics line (7), wherein in the event of operation without the master (6), the communications ports (10) of the safety switches (2) are operated as message outputs, and wherein each safety switch (2) includes a redundant input and output structure, via which switching signals generated in the safety switches (2) can be transmitted, wherein redundant outputs (4) of a safety switch (2) are connected to redundant inputs (3) of a downstream safety switch (2) for forming the series connection (1).

\* \* \* \* \*